United States Patent
Altman

(10) Patent No.: US 9,386,028 B2
(45) Date of Patent: Jul. 5, 2016

(54) SYSTEM AND METHOD FOR MALWARE DETECTION USING MULTIDIMENSIONAL FEATURE CLUSTERING

(71) Applicant: Verint Systems Ltd., Herzelia, Pituach (IL)

(72) Inventor: Yuval Altman, Herzeliya (IL)

(73) Assignee: VERINT SYSTEMS LTD., Herzilya Pituach (IL)

(*) Notice: Subject to any disclaimer, the term of this patent is extended or adjusted under 35 U.S.C. 154(b) by 0 days.

(21) Appl. No.: 14/060,933

(22) Filed: Oct. 23, 2013

(65) Prior Publication Data

US 2014/0165198 A1 Jun. 12, 2014

(30) Foreign Application Priority Data

Oct. 23, 2012 (IL) .......................................... 222648

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 29/06 | (2006.01) | |
| G06F 21/56 | (2013.01) | |
| G06F 21/55 | (2013.01) | |

(52) U.S. Cl.
CPC .......... *H04L 63/1408* (2013.01); *G06F 21/554* (2013.01); *G06F 21/561* (2013.01); *G06F 21/564* (2013.01); *H04L 63/145* (2013.01); *H04L 63/1416* (2013.01); *H04L 2463/144* (2013.01)

(58) Field of Classification Search
CPC ............ H04L 63/1416; H04L 63/1408; H04L 63/145; H04L 2463/144; G06F 21/554; G06F 21/561; G06F 21/564
USPC ....................................................... 726/22–24
See application file for complete search history.

(56) References Cited

U.S. PATENT DOCUMENTS

| | | | |
|---|---|---|---|
| 5,689,442 | A | 11/1997 | Swanson et al. |
| 6,404,857 | B1 | 6/2002 | Blair et al. |
| 6,718,023 | B1 | 4/2004 | Zolotov |
| 6,757,361 | B2 | 6/2004 | Blair et al. |
| 7,216,162 | B2 | 5/2007 | Amit et al. |
| 7,466,816 | B2 | 12/2008 | Blair |

(Continued)

OTHER PUBLICATIONS

Dietrich et al, "CoCoSpot: Clustering and recognizing botnet command and control channels using traffic analysis", Jul. 15, 2012, pp. 475-486.*

(Continued)

*Primary Examiner* — Linglan Edwards
*Assistant Examiner* — Forrest Carey
(74) *Attorney, Agent, or Firm* — Meunier Carlin & Curfman

(57) ABSTRACT

Methods and systems for malware detection techniques, which detect malware by identifying the Command and Control (C&C) communication between the malware and the remote host, and distinguish between communication transactions that carry C&C communication and transactions of innocent traffic. The fine-granularity features are examined, which are present in the transactions and are indicative of whether the transactions are exchanged with malware. A feature comprises an aggregated statistical property of one or more features of the transactions, such as average, sum median or variance, or of any suitable function or transformation of the features.

19 Claims, 3 Drawing Sheets

(56) References Cited

U.S. PATENT DOCUMENTS

| | | | |
|---|---|---|---|
| RE40,634 | E | 2/2009 | Blair et al. |
| 7,587,041 | B2 | 9/2009 | Blair |
| 8,402,543 | B1 | 3/2013 | Ranjan et al. |
| 8,499,348 | B1 | 7/2013 | Rubin |
| 8,682,812 | B1 | 3/2014 | Ranjan |
| 2003/0097439 | A1 | 5/2003 | Strayer et al. |
| 2007/0186284 | A1 | 8/2007 | McConnell |
| 2008/0014873 | A1 | 1/2008 | Krayer et al. |
| 2008/0028463 | A1 | 1/2008 | Dagon et al. |
| 2008/0141376 | A1 | 6/2008 | Clausen et al. |
| 2008/0261192 | A1 | 10/2008 | Huang et al. |
| 2008/0285464 | A1 | 11/2008 | Katzir |
| 2009/0216760 | A1 | 8/2009 | Bennett |
| 2010/0037314 | A1 | 2/2010 | Perdisci |
| 2010/0071065 | A1 | 3/2010 | Khan et al. |
| 2011/0099620 | A1 | 4/2011 | Stavrou et al. |
| 2011/0271341 | A1 | 11/2011 | Satish et al. |
| 2012/0017281 | A1 | 1/2012 | Banerjee |
| 2012/0167221 | A1 | 6/2012 | Kang et al. |
| 2012/0311708 | A1* | 12/2012 | Agarwal et al. ............ 726/24 |
| 2013/0014253 | A1 | 1/2013 | Neou |
| 2013/0333038 | A1 | 12/2013 | Chien |
| 2015/0135326 | A1 | 5/2015 | Bailey, Jr. |

OTHER PUBLICATIONS

Bailey, Michael, et al., "Automated Classification and Analysis of Internet Malware," RAID, 2007, pp. 178-197.
Bayer, Ulrich, et al., "Scalable, Behavior-Based Malware Clustering," Secure Systems Lab, Technical University Vienna, 2009, 18 pages.
BotMiner: Clustering Analysis of Network Traffic for Protocol- and Structure-Independent Botnet Detection, 17th USENIX Security Symposium, Jul. 15, 2008, pp. 139-154.
Thonnard, Olivier, et al., "Actionable Knowledge Discovery for Threats Intelligence Support using a Multi-Dimensional Data Mining Methodology," 2008 IEEE International Conference on Data Mining Workshops, 2008, pp. 154-163.
European Search Report, dated Mar. 24, 2014, received in connection with corresponding European Application No. 13189920.5.
Liu, Rong-Tai, et al., "A Fast Pattern-Match Engine for Network Processor-based NIDS," Proceedings of the 20th International Conference on Information Technology (ITCC'04), Dec. 5, 2006, 23 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "The R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "Integrated Digital Audio Software R&S AllAudio," Specifications, 8 pages.
Metronome SSL Inspector Solution Overview White Paper, "Examining SSL-encrypted Communications," 2010, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fisk, Mike, et al., "Applying Fast String Matching to Intrusion Detection," Los Alamos National Laboratory and University of California San Diego, 22 pages.
Fox Replay BV, "FoxReplay Analyst," http//www.foxreplay.com, Revision 1.0, Nov. 2007, 5 pages.
Fox-IT BV, "FoxReplay Analyst," Product Brochure, http//www.foxreplay.com, 2 pages.
Aho, Alfred V., et al., "Efficient String Matching: An Aid to Bibliographic Search," Communication of the ACM, Jun. 1975, vol. 18, No. 6, pp. 333-340.
Coffman, T., et al., "Graph-Based Technologies for Intelligence Analysis," CACM, Mar. 2004, 12 pages.
Cloudshield, Inc., "Lawful Intercept Next-Generation Platform," 2009, 6 pages.
Goldfarb, Eithan, "Mass Link Analysis: Conceptual Analysis," 2006, Version 1.1, 21 pages.
Verint Systems Inc., "Mass Link Analysis: Solution Description," Dec. 2008, 16 pages.
High-Performance LI with Deep Packet Inspection on Commodity Hardware, ISS World, Singapore, Jun. 9-11, 2008, Presenter: Klaus Mochalski, CEO, ipoque, 25 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Schulzrinne, H., et al., "RTP: A Transport Protocol for Real-Time Applications," Standards Track, Jul. 2003, 89 pages.
Sheng, Lei, "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Svenson, Pontus, "Social network analysis and information fusion for anti-terrorism," CIMI, 2006, 8 pages.
Tongaonkar, Alok S., "Fast Pattern-Matching Techniquest for Packet Filtering," Stony Brook University, May 2004, 44 pages.
Yang, Liu, "Distance Metric Learning: A Comprehensive Survey," Department of Computer Science and Engineering, Michigan State University, May 19, 2006, 51 pages.
Yu, Fang, et al., "Fast and Memory-Efficient Regular Expression Matching for Deep Packet Inspection," ANCS'06, Dec. 3-5, 2006, San Jose, California, 10 pages.
Yu, Fang, et al., "Gigabit Rate Packet Pattern-Matching Using TCAM," Proceedings of the 12th IEEE International Conference on Network Protocols (ICNP'04), 2004, 10 pages.
Bilge, Leyla, et al., "Exposure: Finding Malicious Domains Using Passive DNS Analysis," 2014, 17 pages.
Eslahi, M., "botAnalytics: Improving HTTP-Based Botnet Detection by Using Network Behavior Analysis system," Dissertation, Faculty of Computer Science and Information Technology, University of Malaya, 2010, 124 pages.
European Search Report and Preliminary Opinion, dated Jan. 15, 2014, received in connection with corresponding European Application No. 13165912.
Gu, G., et al., "BotSniffer: Detecting Botnet Command and Control Channels in Network Traffic," Proceedings of the 15th Annual Network and Distributed System Security Symposium (NDSS'08), San Diego, California, 2008, 18 pages.
Jacob, G., et al., "Jackstraws: Picking Command and Control Connections from Bot Traffic," Proceedings of the 20th Usenix Security Symposium, San Francisco, 2011, 16 pages.

(56) References Cited

OTHER PUBLICATIONS

Livadas, C., et al., "Using Machine Learning Techniques to Identify Botnet Traffic," In $2^{nd}$ IEEE LCN Workshop on Network Security (WoNS'2006), 2006, pp. 967-974.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

\* cited by examiner

SYSTEM AND METHOD FOR MALWARE DETECTION USING MULTIDIMENSIONAL FEATURE CLUSTERING

FIELD OF THE DISCLOSURE

The present disclosure relates generally to data security, and particularly to methods and systems for detecting malicious software in computer systems.

BACKGROUND OF THE DISCLOSURE

Various types of malicious software, such as viruses, worms and Trojan horses, are used for conducting illegitimate operations in computer systems. Malicious software may be used, for example, for causing damage to data or equipment, or for extracting or modifying data. Some types of malicious software communicate with a remote host, for example for Command and Control (C&C) purposes.

Various techniques for detecting malicious software are known in the art. For example, Rieck et al. describe methods for detecting malicious software at a point when it initiates contact with its maintainer, in "Botzilla: Detecting the 'Phoning Home' of Malicious Software," Proceedings of the ACM Symposium on Applied Computing (SAC), Sierre, Switzerland, Mar. 22-26, 2010, which is incorporated herein by reference.

Jacob et al. describes a system for identifying C&C connections, in "JACKSTRAWS: Picking Command and Control Connections from Bot Traffic," Proceedings of the 20th Usenix Security Symposium, San Francisco, Calif., Aug. 8-12, 2011, which is incorporated herein by reference.

Gu et al. describe a method that uses network-based anomaly detection to identify botnet C&C channels in a local area network, in "BotSniffer: Detecting Botnet Command and Control Channels in Network Traffic," Proceedings of the 15th Annual Network and Distributed System Security Symposium (NDSS'08), San Diego, Calif., February, 2008, which is incorporated herein by reference.

Gu et al. describe a C&C detection framework that is independent of botnet C&C protocol and structure, in "BotMiner: Clustering Analysis of Network Traffic for Protocol- and Structure-Independent Botnet Detection," Proceedings of the 17th USENIX Security Symposium, San Jose, Calif., 2008, which is incorporated herein by reference.

Eslahi describes methods for detecting HTTP-based Botnets based on the network behaviour analysis, in "botAnalytics: Improving HTTP-Based Botnet Detection by Using Network Behavior Analysis System," Faculty of Computer Science and Information Technology, University of Malaya, 2010, which is incorporated herein by reference.

SUMMARY OF THE DISCLOSURE

An embodiment that is described herein provides a method including specifying multiple features, which are present in communication transactions held in a computer network and which are indicative of whether the transactions are exchanged with a malicious software. A plurality of malware transactions is represented by respective elements in a multi-dimensional space, whose dimensions are spanned respectively by the features, so as to form one or more clusters of the elements. An identification is made whether an input communication transaction is malicious, by measuring respective distance metrics between an element of the multi-dimensional space representing the input communication transaction and the clusters, and evaluating a criterion with respect to the distance metrics.

In some embodiments, representing the malware transactions includes forming the clusters in a learning process that analyzes a first set of known innocent transactions and a second set of known malware transactions. In an embodiment, the distance metrics and the criterion are defined irrespective of a number of the elements in each cluster. In a disclosed embodiment, representing the malware transactions includes forming the clusters using a first distance metric, and measuring the distance metrics between the input communication transaction and the clusters includes using a second distance metric that is different from the first distance metric.

In some embodiments, measuring the distance metrics includes assigning each cluster a respective weight. In an embodiment, the respective weight assigned to each cluster does not depend on a number of the elements in the cluster. In other embodiments, representing the malware transactions includes representing each cluster by a single respective representative transaction, and measuring the distance metrics includes calculating the distance metrics between representative transactions of the respective clusters and the element representing the input communication transaction. In an example embodiment, representing each cluster by the respective representative transaction includes calculating a center of mass of the malware transactions in the cluster.

In another embodiment, evaluating the criterion includes identifying a new malware variation associated with one of the clusters. In yet another embodiment, evaluating the criterion includes identifying a hybrid malware that includes software code from two or more malware types associated with two or more respective clusters. In still another embodiment, the method includes invoking responsive action upon deciding that the input communication transaction is malicious.

In some embodiments, measuring the distance metrics includes measuring first and second different distance metrics for respective different first and second clusters. Measuring the different distance metrics may include assigning to the first and second clusters respective different weights that emphasize different dimensions of the multi-dimensional space. In an embodiment, representing the malware transactions includes receiving a definition of the clusters from an external source.

There is additionally provided, in accordance with an embodiment of the present invention, apparatus including an interface and a processor. The interface is configured to receive communication transactions held in a computer network. The processor is configured to hold a specification of multiple features, which are present in the communication transactions and which are indicative of whether the transactions are exchanged with a malicious software, to represent a plurality of malware transactions by respective elements in a multi-dimensional space, whose dimensions are spanned respectively by the features, so as to form one or more clusters of the elements, and to identify whether an input communication transaction is malicious by measuring respective distance metrics between an element of the multi-dimensional space representing the input communication transaction and the clusters, and evaluating a criterion with respect to the distance metrics.

The present disclosure will be more fully understood from the following detailed description of the embodiments thereof, taken together with the drawings in which:

DETAILED DESCRIPTION OF EMBODIMENTS

Overview

Figure 1:
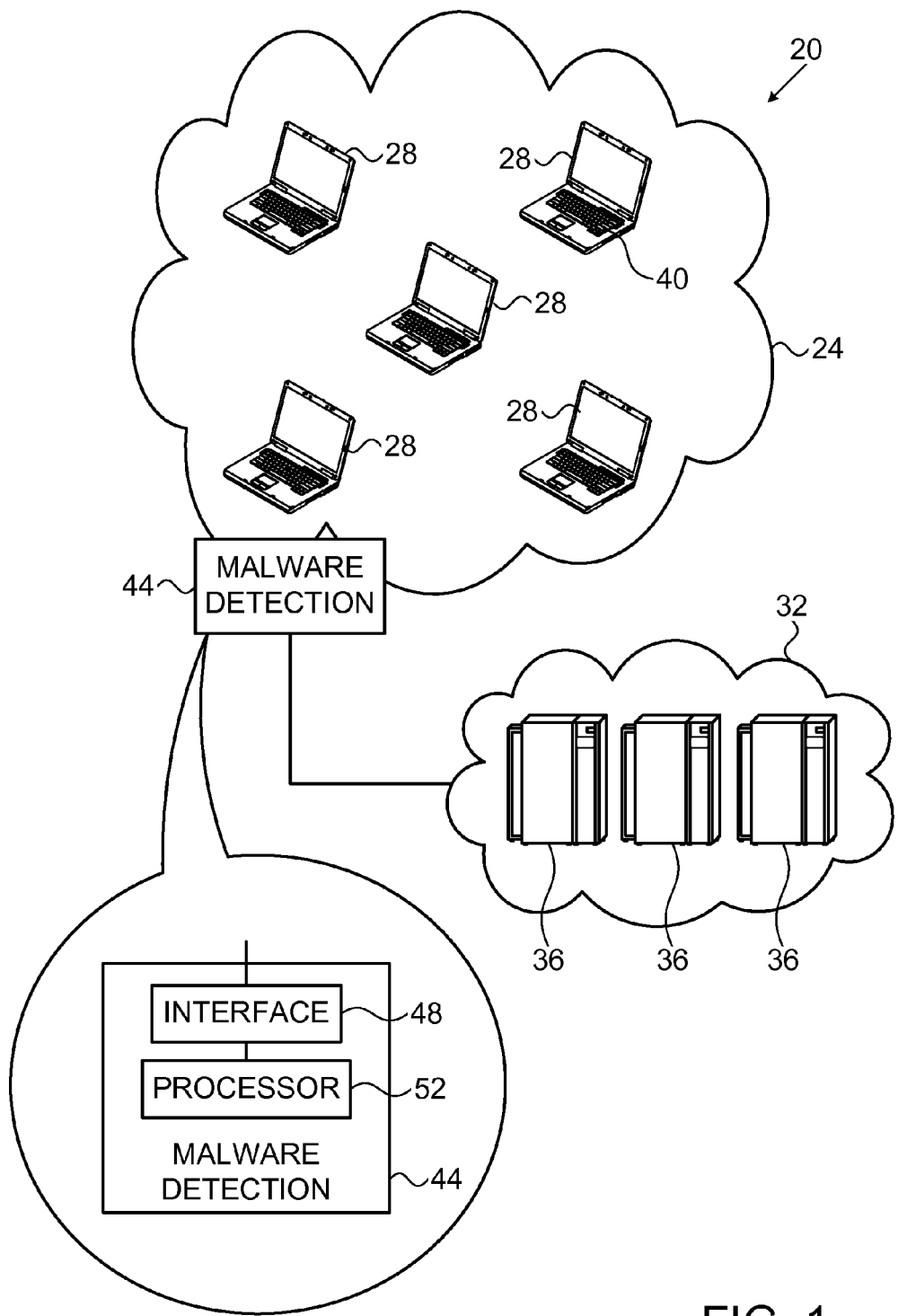
FIG. 1 is a block diagram that schematically illustrates a computer network employing malicious software detection, in accordance with an embodiment that is described herein.

Some types of malicious software ("malware") are controlled by a remote host. Communication between the malware and the host is referred to herein as Command and Control (C&C) communication, and it may involve communication from the host to the malware and/or from the malware to the host. In some malware types, the C&C communication is disguised in communication transactions (e.g., request-response transactions) of a conventional communication protocol, such as in Hyper Text Transfer Protocol (HTTP), HTTP Secure (HTTPS), Domain Name Service (DNS) or Simple Mail Transfer Protocol (SMTP) transactions. This disguise is typically meant to bypass security equipment such as firewalls.

Embodiments that are described herein provide improved malware detection techniques, which detect malware by identifying the C&C communication between the malware and the remote host, and distinguish between communication transactions that carry C&C communication and transactions of innocent traffic. Although the embodiments described herein refer mainly to request-response transactions, the disclosed techniques can be used with other types of transactions, as well.

The methods and systems described herein typically examine fine-granularity features, which are present in the transactions and are indicative of whether the transactions are exchanged with malware. For example, if a transaction comprises a Uniform Resource Identifier (URI) that appears to be a random string rather than a meaningful name, this feature may be indicative of malware. Other examples of features indicative of malware may comprise the absence of a referrer, an exceedingly short response content or request user agent, among others. In some embodiments, a feature comprises an aggregated statistical property of one or more features of the transactions, such as average, sum median or variance, or of any suitable function or transformation of the features.

One of the challenges of malware detection is that different malware instances often differ from one another in their features. These differences are typically applied intentionally in order to make it difficult to detect the malware. In many practical cases, malware can be classified into families having similar, if not identical, features. Typically although not necessarily, a given malware family is usually written by the same author or authors, or using the same infrastructure component. The methods and systems described herein use multi-dimensional clustering techniques to find groups ("clusters") of malware transactions having similar sets of features. New transactions are then classified as malicious or innocent based on their distances from known clusters.

The disclosed cluster-based techniques are highly effective in the commonly occurring scenario, in which the available examples of malware transactions are not distributed evenly among the different malware families. In other words, the available malware examples may comprise a large number of examples of a certain malware family, and only few examples of another family. Unless accounted for, these differences may bias and distort the classification decisions considerably. Measuring distances to clusters instead of distances to individual malware transactions eliminates this problem.

In the disclosed embodiments, a malware detection unit represents communication transactions as respective elements in a multi-dimensional space that is spanned by the malware-related features. In other words, each axis of the multi-dimensional space corresponds to a respective feature (low-level or aggregate), and each transaction is represented by a respective vector or tuple (also referred to as point or element) in the multi-dimensional space. The coordinate of a given element in the $i^{th}$ dimension comprises the value (binary or multi-valued) of the $i^{th}$ feature in the corresponding transaction. When using this representation, and the related distance functions, a group of malware transactions that share a similar set of features will form a geometrical cluster in the multi-dimensional space. Different families of malware transactions will correspond to different clusters, and related malware clusters are expected to be relatively close in one or more of the dimensions.

In some embodiments, the malware detection unit receives a new input transaction for analysis. The malware detection unit represents the input transaction as an element in the multi-dimensional space, and measures distance metrics between this element and the known clusters. By evaluating a predefined classification criterion with respect to the distance metrics, the malware detection unit decides whether the transaction is innocent or malicious. Upon deciding that the transaction is malicious, the malware detection unit may take various actions, such as block subsequent traffic or issue an alert.

Typically, the clusters are formed in a "supervised learning" process in which the malware detection unit analyzes both positive examples (transactions known to be malicious) and negative examples (transactions known to be innocent). As explained above, the available positive examples may comprise a large number of examples of a certain malware family, and only few examples of another family. As a result, the clusters may differ considerably from one another in the number of elements. Thus, in some embodiments the distances and the classification criterion are defined irrespective of the number of elements in each cluster. In other words, the decision whether an input transaction is innocent or malicious is not affected by the fact that some clusters have more elements than others.

For example, the malware detection unit may represent each cluster by a single representative element (e.g., the "center of gravity" or "center of mass" of the cluster), and measure the distance metrics between the input transaction and the representative elements. This technique reduces the sensitivity of the malware classification decisions to differences in cluster size.

The disclosed clustering-based techniques are able to detect malware transactions with high detection probability and small false alarm probability. In particular, the disclosed techniques are highly effective in detecting new malware variations that were not encountered previously.

System Description

FIG. 1 is a block diagram that schematically illustrates a computer system 20 employing malicious software detection, in accordance with an embodiment that is described herein. The present example shows an internal computer network 24 of an organization, which comprises multiple computers 28, such as personal computers, workstations, mobile computing or communication devices or virtual machines. Network 24 is connected to a Wide Area Network (WAN) 32, such as the Internet. Computers 28 may communicate with one another over network 24, and/or with servers or other computers 36 in network 32. The system configuration of FIG. 1 is shown purely by way of example, and the disclosed techniques can also be used with various other suitable system configurations.

In some scenarios, a certain computer 28 in network 24 may be infected with malicious software 40 (referred to as "malware"), for example a virus, a worm or a Trojan horse. The malware may carry out various kinds of illegitimate actions, for example steal data from the infected computer or otherwise from network 24, modify or damage data, or cause damage to the infected computer or other equipment of network 24.

Some types of malware are controlled by a remote host. In the present example, malware 40 is controlled by one of computers 36, external to network 24. Communication between the malware and the remote host may be bidirectional (e.g., command and control between the host and the malware, and extracted data from the malware to the host) or unidirectional (e.g., only from the host to the malware, or only from the malware to the host).

In some embodiments, a malware detection unit 44 identifies malicious software that has infected one or more of computers 28, such as malware 40. Unit 44 detects malware by monitoring communication in network 24, e.g., internal communication within network 24 and/or communication between network 24 and network 32. In some embodiments, as will be explained in detail below, unit attempts to identify Command and Control (C&C) communication between malware 40 and its remote host.

In an embodiment, malware detection unit 44 comprises an interface 48 for connecting to network 24, and a processor 52 that carries out the malware detection techniques described herein. Interface 48 may comprise, for example, a network probe, or any other suitable network interface. In some embodiments, the functions of processor 52 are partitioned among multiple processors (e.g., servers) in a distributed configuration that enables high scalability.

The configurations of system 20 and unit 44 shown in FIG. 1 are example configurations, which are chosen purely for the sake of conceptual clarity. In alternative embodiments, any other suitable configuration of system and/or unit 44 can be used. For example, in the example of FIG. 1 unit 44 is placed between network 24 and WAN 32, such that the traffic between the two networks passes through unit 44. In alternative embodiments, unit 44 may comprise a node in network 24 that is provided with network traffic for monitoring, but without having the network traffic pass through it.

Some elements of unit 44 may be implemented in hardware, e.g., in one or more Application-Specific Integrated Circuits (ASICs), Field-Programmable Gate Arrays (FPGAs) or network processors. Additionally or alternatively, some elements of unit 44 can be implemented using software, or using a combination of hardware and software elements.

Some of the functions of unit 44, such as the functions of processor 52, may be carried out using one or more general-purpose processors (e.g., servers), which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Features Indicative of Malware C&C Communication

As noted above, malware 40 is assumed to communicate with a remote host. The communication between the malware and the host is referred to herein as C&C communication. C&C communication may be conducted in either direction, i.e., from the host to the malware and/or from the malware to the host.

In some embodiments, unit 44 identifies C&C communication that is disguised as an exchange of communication transaction, such as request-response transactions of a conventional protocol. Further aspects of such malware detection techniques are addressed in Israel Patent Application 219499, filed Apr. 30, 2012, which is assigned to the assignee of the present patent application and whose disclosure is incorporated herein by reference.

The protocol in question may comprise, for example, Hyper Text Transfer Protocol (HTTP), HTTP Secure (HTTPS) or Domain Name Service (DNS). In this sort of malware implementation, the computer infected with the malware (referred to as a client) communicates with the remote host (referred to as host) using transactions of the protocol, such that the C&C communication (e.g., commands and/or exchanged data) are disguised as parts of the transactions.

In the context of the present patent application and in the claims, the term "communication transaction" or "transaction" refers to any exchange of messages between two endpoints, e.g., a client and a host. The term "request-response transaction" refers to any exchange of messages between two endpoints in which one endpoint sends a request message to the other endpoint, and the other endpoint answers the request message with a response message. Some examples of request-response transactions comprise HTTP request and HTTP response, HTTPS request and HTTPS response, DNS request and DNS response, Simple Mail Transfer Protocol (SMTP) and SMTP response, or any other suitable transaction type.

In some embodiments, processor 52 of unit 44 monitors request-response transactions that are exchanged in system 20, and extracts the subset of transactions that are conducted between a given client and a given host. In an example embodiment, the given client and the given host are identified by their respective Internet Protocol (IP) addresses. In other words, the transactions in the subset are identified by a particular client IP address and host IP address.

Generally, however, the client and/or host may be identified using any other suitable means. For example, processor 52 may obtain a host name from the DNS query preceding the access to the host, or from the HTTP headers within an HTTP request. As another example, processor 52 may deduce client IP addresses from passive analysis of RADIUS traffic, or by receiving RADIUS records from a RADIUS server (not shown in the figure).

Processor 52 evaluates one or more features over the subset of request-response transactions pertaining to a given client-host pair. The features are indicative of whether the transactions are innocent or whether they are part of malware C&C communication. Several example features, which can be used for differentiating between malware C&C communication and innocent traffic, are described below. These features distinguish malware C&C communication from innocent browsing traffic of network users, as well as from traffic of applications that innocently exploit the request-response protocols (e.g., Skype).

The description that follows refers to analysis of request-response transactions between a given client and a given host. In alternative embodiments, however, unit 44 may analyze the request-response transactions for a given client (possibly with multiple hosts), in order to verify whether the given client is infected with malware (which possibly conducts C&C communication with multiple hosts). Further alternatively, unit 44 may analyze the request-response transactions for a given host (possibly with multiple clients), in order to verify whether the given host controls malware in one or more clients (which, in turn, increases the likelihood the host is indeed malicious).

Consider, for example, a transaction comprising an HTTP request from a client and a corresponding HTTP response returned by a host. Several example features that may be indicative of malware C&C transactions comprise:

The URI in the HTTP request is a random string and not a meaningful name.
The HTTP response does not indicate a referrer.
The content length in the HTTP response is shorter than a certain threshold value.
The user agent in the HTTP request is shorter than a certain threshold value.
The number of fields in the HTTP request is smaller than a certain threshold value.
The returned content in the HTTP response in an executable.

Other examples of distinguishing features are the length of the cookie field in the HTTP request, or the entropy of the sequence of bytes forming the value of the cookie field. The features described above are chosen purely by way of example. In alternative embodiments, any other suitable feature can be used for distinguishing between malware C&C communication and innocent traffic.

Additionally or alternatively, a given feature may comprise a characteristic of an underlying protocol or protocols used for transmitting the request-response transactions, e.g., TCP/IP, UDP/IP or ICMP/IP, among others. Such characteristics may comprise, for example, IP addresses, port numbers, packet size in bytes, average packet size, packet timing, or any other suitable characteristic related to the transfer protocol.

In some embodiments, a certain feature comprises an aggregated statistical property of one or more features of the request-response transactions. In a typical embodiment, processor 52 evaluates an aggregate statistical property of a set of multiple different features. Such an aggregate statistical property can provide a better indication of malware, in comparison with a statistical property of a single feature. Further alternatively, processor 52 may evaluate the aggregate statistical property over some suitable function or transformation of the features, such as kernel or string entropy.

Processor 52 may calculate the aggregated statistical property, for example, over the request-response transactions between a given client and a given host, over the request-response transactions of a given client (possibly with multiple hosts), or over the request-response transactions of a given host (possibly with multiple clients).

Processor 52 may evaluate any suitable statistical property of a certain feature of the transactions, for example a mean value of a feature, a standard deviation or variance of a feature, or a count of the distinct values of a feature. In an example embodiment, processor 52 evaluates the standard deviation of the length of the cookie field over multiple transactions between a given client and a given host. If the standard deviation is larger than a certain predefined value, there is high likelihood that the given client may be infected with malware controlled by the given host.

Another example of an aggregate statistical property is the number of distinct values given to a certain feature, e.g., the number of distinct values taken by the cookie field. In alternative embodiments, processor 52 may calculate any other suitable aggregate statistical property of a given feature. In some embodiments, processor 52 calculates an estimate of the aggregate statistical property instead of the actual statistical property, in order to reduce computation complexity.

In some embodiments, the aggregate statistical property is calculated over specific values given to specific fields. For example, in an innocent Web site, most URIs will typically have repetitions across multiple request-response transactions (different users will access the same URI). A malicious host and its URIs, on the other hand, are typically accessed very rarely, and the repetitions are thus very low.

An example embodiment of counting the number of distinct values of a feature is counting the number of URIs used in a specific Web site. A malicious host may not have real URIs, the client will use the value in the URI as a way to send information, and the number of distinct URI values will thus be very high. Another example is counting the distinct values of the USER AGENT field: Usually, all the HTTP communication of a certain client originates from one or two browsers installed on it, and therefore will have only one or two USER AGENT field values.

Malware Detection Using Multi-Dimensional Feature Clustering

In many practical scenarios, different occurrences or instances of certain malware differ from one another in the features that characterize them and/or in the values of these features. These variations are often introduced intentionally into the malware in order to evade detection. Some malware types can thus be classified into families having similar sets of features.

In some embodiments, malware detection unit 44 extracts a set of N predefined features from communication transactions (e.g., request-response transactions). Unit 44 represents the transactions as respective elements in a multi-dimensional space that is spanned by the features (in the present example an N-dimensional space).

In other words, each axis of the multi-dimensional space corresponds to a respective feature (low-level or aggregate), and each transaction is represented by a respective point, or element, in the multi-dimensional space. The $i^{th}$-dimension coordinate of a given element comprises the value (Boolean or multi-valued) of the $i^{th}$ feature in the corresponding transaction.

When using this representation, a group of malware transactions that share a similar set of features will form a geometrical cluster in the multi-dimensional space. Different families of malware transactions correspond to different clusters.

Figure 2:
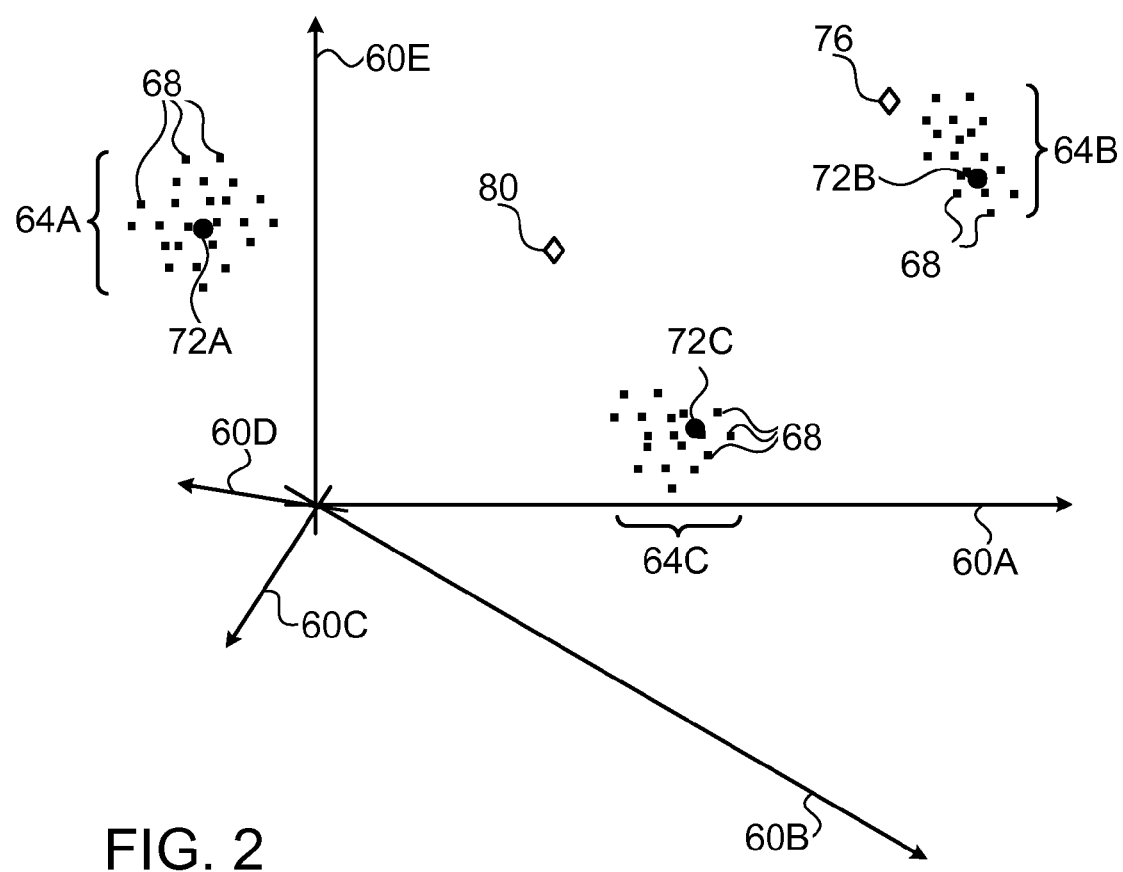
FIG. 2 is a graph that schematically illustrates a process of identifying malware using multi-dimensional feature clustering, in accordance with an embodiment that is described herein.

FIG. 2 is a graph that schematically illustrates a process of identifying malware using multi-dimensional feature clustering, in accordance with an embodiment that is described herein. In the example of FIG. 2, the multi-dimensional space has five dimensions. The space is spanned by five malware-related features, corresponding to axes 60A . . . 60E. In alternative embodiments, the multi-dimensional space may comprise any other suitable number of dimensions. The features may comprise any suitable feature of the communication transactions, such as the features described above.

When using the multi-dimensional space representation, each communication transaction is represented by a respective point 68, i.e., a respective element of the space. In the present example, elements 68 are clustered in three clusters 64A . . . 64C. Each cluster comprises a group of elements having similar coordinates, i.e., a group of transactions having similar features.

In order to decide whether a new input transaction is malicious or innocent, processor 52 of unit 44 measures distance metrics between clusters 64A . . . 64C and the element representing the new input transaction. (The description herein uses the terms "transaction" and "element of the multi-dimensional space that represents the transaction" interchangeably.)

The example of FIG. 2 shows two elements 76 and 80 that correspond to new input transactions. Element 76 is close to cluster 64B. Therefore, processor 52 is likely to decide that element 76 corresponds to a malicious transaction from the family of cluster 64B. Element 80, on the other hand, is distant from all the known clusters. Therefore, processor 52 is likely to decide that element 80 represents an innocent transaction.

Processor 52 may define and measure various kinds of distance metrics between the new input transaction and the clusters. Based on the distance metrics, processor 52 may evaluate any suitable classification criterion to decide whether the new input transaction is innocent or malicious. In an embodiment, the distance metrics and/or the classification criterion are defined so as to identify hybrid malware, i.e., malware that is made-up of different code sections taken from different malware families corresponding to different clusters.

In one example embodiment, processor 52 calculates the distance between the new input transaction and the center of each cluster (the cluster center is typically defined as the average over all coordinates of the cluster elements in the multi-dimensional space). In another example embodiment, after calculating the center of each cluster, processor 52 removes a certain percentage (e.g., 10%) of outliers in the cluster (i.e., the cluster elements that are most distant from the center), and calculate the cluster center again. In an alternative embodiment, processor 52 calculates the distance between the new input transaction and a given cluster as the shortest distance to any element in the cluster (i.e., to the closest element in the cluster).

In some embodiments, processor 52 may assign each cluster a respective weight in the distance metric calculation, which may depend on the cluster size. The dependence of the weight on cluster size may be, for example, logarithmic. Alternatively, the dependence may have a certain cut-off, such that very small clusters may be assigned a smaller weight (e.g., ½) relative to the weights of larger clusters. In some embodiments, the distance metric emphasizes or gives higher weight to certain malware features (i.e., to certain dimensions of the multi-dimensional space).

In some embodiments, processor 52 evaluates the classification criteria (malicious/innocent decision) based on the distances to the various clusters. In an example embodiment, processor 52 averages the distances to the various clusters, possibly after removing a certain percentage of outliers (clusters that are most distant from the new transaction). If the average distance is below some threshold the new transaction is regarded malicious, and vice versa. In another embodiment, the processor compares the median distance to the clusters to a certain threshold number.

In some embodiments, processor 52 uses a certain distance metric when creating the clusters, and a different distance metric to measure the distance of the new input transaction to existing clusters. In yet another embodiment, processor 52 uses different distance metrics for different clusters, e.g., distance metrics that emphasize or focus on the features (dimensions of the multi-dimensional space) that are the core of each cluster.

In some embodiments, processor 52 evaluates the classification criterion by estimating the probability that a random element in the multi-dimensional space will be closer (e.g., have a shorter average distance or median distance) to the known clusters. In an embodiment, processor 52 assigns respective weights to the clusters according to their importance (e.g., using some external knowledge), or according to their rarity (e.g., normalizing the distances by the inverse of the cluster size).

Further additionally or alternatively, processor 52 may define and calculate distance metrics, and/or define and evaluate classification criteria, in any other suitable way.

In some embodiments, processor 52 forms clusters 64A . . . 64C by running a "supervised learning" process. In such a process, processor 52 analyzes both positive examples (transactions known to be malicious) and negative examples (transactions known to be innocent), possibly with the assistance of a human user.

In many practical cases, the positive examples available for the supervised learning process comprise different numbers of examples for different malware families (i.e., for different clusters). In FIG. 2, for example, the number of elements 68 differs from one cluster to another. These differences in cluster size may distort the distance metric measurements and the classification decisions: Clusters having relatively large numbers of elements tend to dominate the decisions.

In order to solve this problem, in some embodiments the distance metrics and the classification criterion used by processor 52 are defined irrespective of the number of elements in each cluster. In other words, the decision whether an input transaction is innocent or malicious is not affected by the fact that some clusters have more elements than others.

In some embodiments, processor 52 represents each cluster by a single representative element, and measures the distance metrics between the new input transaction and the representative elements. This technique reduces or eliminates the sensitivity of the malware classification decisions to differences in cluster size. More generally speaking, processor 52 may define and apply different distance metrics for different clusters. The distance metric of a given cluster typically emphasizes the core characteristics of each cluster by emphasizing suitable dimensions of the multi-dimensional space.

Other examples of distance metrics may comprise the distance to the convex-hull of the cluster, or the distance to the enclosing hyper-rectangle of the cluster. In various embodiments, distance metrics may comprise, but are not limited to, Euclidean distances, Mahalanobis distances, and/or Learned distance metrics. Learned distance metrics may be global or local, supervised or unsupervised, or kernel-method based. Certain aspects of learned distance metrics are addressed by Yang, in "Distance Metric Learning: A Comprehensive Survey," Department of Computer Science and Engineering Michigan State University, May 19, 2006, which is incorporated herein by reference.

In the example of FIG. 2, processor 52 represents clusters 64A . . . 64C by respective representative elements 72A . . . 72C. In order to evaluate element 76, processor 52 calculates three distance metrics between element 76 and elements 72A . . . 72C. A similar process is performed for element 80.

The representative element is not necessarily equal to any of the elements 68 in the cluster. Rather, the representative element is typically a point in space whose coordinates are calculated over the cluster elements. In a given cluster, processor 52 may calculate the representative element in various ways. For example, the representative element may comprise the "center of gravity" or "center of mass" of the cluster, i.e., the average multi-dimensional location averaged over the cluster elements. Alternatively, processor 52 may calculate the representative element for a given cluster in any other suitable way.

Figure 3:
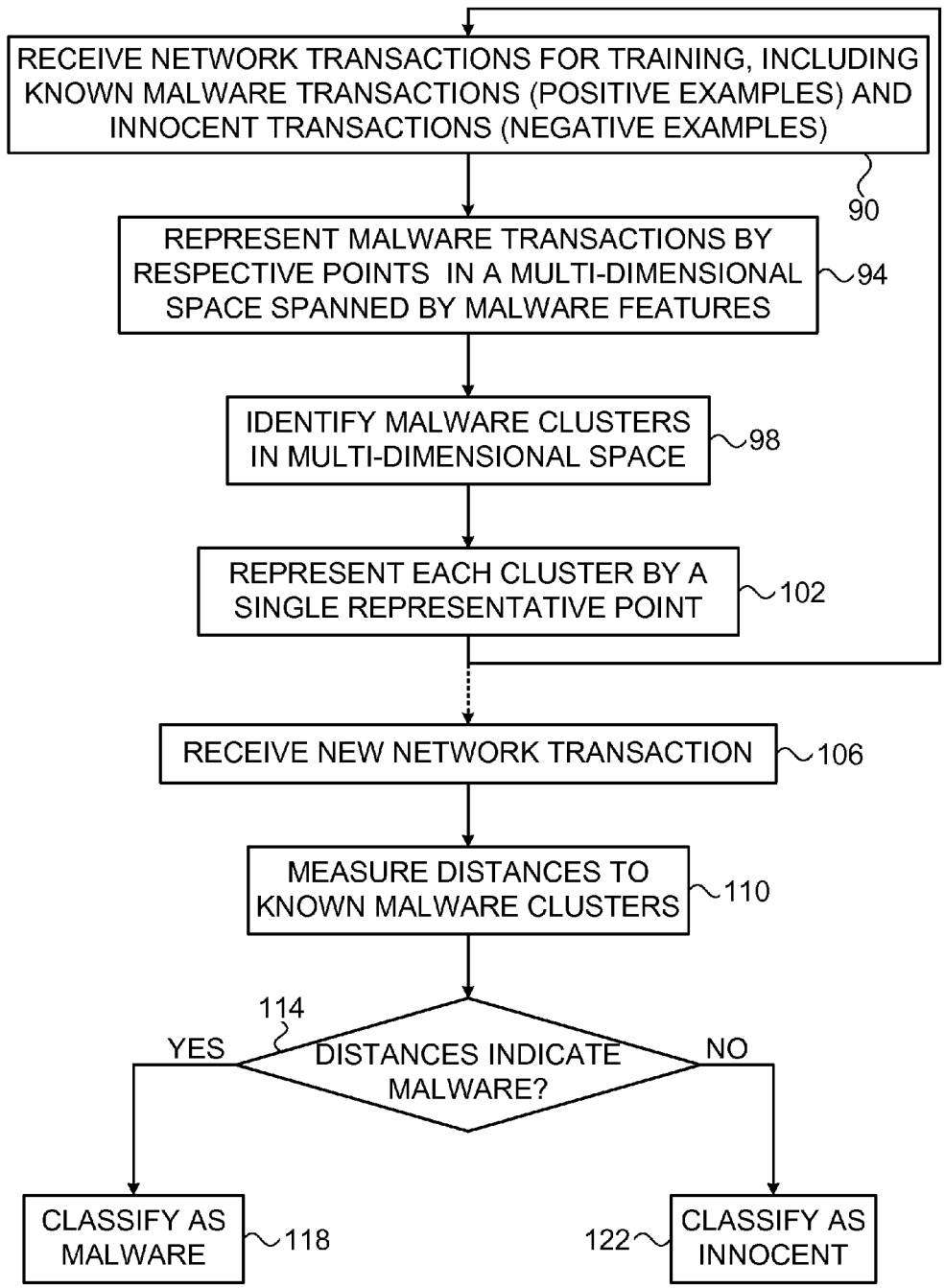
FIG. 3 is a flow chart that schematically illustrates a method for malware detection, in accordance with an embodiment that is described herein.

FIG. 3 is a flow chart that schematically illustrates a method for malware detection, in accordance with an embodiment that is described herein. Steps 90-102 of FIG. 3 show the supervised learning process. Steps 106-122 show a subsequent process of evaluating a new input transaction using the clusters formed in the supervised learning process.

The method begins with processor 52 receiving a set of communication transactions for training, at a training input step 90. The training set comprises both positive examples (transactions known to be malicious) and negative examples (transactions known to be innocent). Processor 52 represents the malicious transactions as respective elements of the multi-dimensional space, as explained above, at a multi-dimensional representation step 94.

Processor 52 identifies one or more clusters of elements in the multi-dimensional space, at a cluster identification step 98. Processor 52 represents each cluster by a respective single representative element, at a representative calculation step 102. The method then loops back to step 90. The learning process continues to form clusters, for example until the training set is exhausted or until some other condition is met. The output of this process is a set of representative elements, e.g., elements 72A . . . 72C of FIG. 2 above.

At some point in time, processor 52 receives a new input transaction for classification, at an input step 106. The transaction is typically conducted between one of computers 36 and one of computers 28 (FIG. 1). Processor 52 calculates a respective distance metric between the multi-dimensional space element representing the new input transaction and each representative element, at a distance measurement step 110.

Processor 52 evaluates the classification criterion based on the distance metrics, and checks whether the criterion indicates that the new input transaction is malicious or innocent, at a criterion evaluation step 114.

If the criterion indicates that the new input transaction is malicious, processor 52 classifies the transaction as malware, at a malware classification step 118. Upon classifying the transaction as malicious, processor 52 may take various actions, such as block subsequent traffic in the same flow, or with the same client or host, and/or issue an alert. If, on the other hand, the criterion indicates that the new input transaction is innocent, processor 52 classifies the transaction as innocent, at an innocent classification step 122.

In the embodiments described above, the clustering process is performed by processor 52 of system 44. In alternative embodiments, however, processor 52 may receive a definition of the clusters from an external source, such as an external system or operator. In these embodiments, processor 52 performs classification of new input transactions using the externally-provided clusters, but does not perform the clustering itself.

Although the embodiments described herein mainly address detection of malware C&C communication, the principles of the present disclosure can also be used for other applications, e.g., for detecting illegitimate attempts to intrude into a network.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

specifying, by at least one hardware processor, multiple features, which are present in communication transactions conducted between computers in a computer network and which are indicative of whether the transactions are exchanged with a malicious software;

representing, by the at least one hardware processor, a plurality of malware transactions by respective elements in a multi-dimensional space, whose dimensions are spanned respectively by the features, so as to form plurality of clusters of the elements, wherein each transaction is represented by a respective tuple in the multi-dimensional space and different families of malware transactions correspond to different clusters of the plurality of clusters;

receiving, by a at least one hardware interface operatively coupled to the at least one hardware processor, a new input communication transaction conducted between computers in the computer network; and identifying, by the at least one hardware processor, whether the new input communication transaction is malicious by at least:

representing, by the at least one hardware processor, the new input transaction as a new element tuple in the multi-dimensional space;

measuring, by the at least one hardware processor, respective distance metrics between the new element of the multi-dimensional space and each cluster of the plurality of clusters; and evaluating, by the at least one hardware processor, a criterion with respect to the distance metrics, wherein evaluating the criterion with respect to the distance metrics comprises: defining a classification criterion that identifies hybrid malware comprising different code sections taken from at least two of the different malware families associated with at least two different clusters of the plurality of clusters, and applying the defined criterion to the measured respective distance metrics between the new element of the multi-dimensional space and the at least two different clusters.

2. The method according to claim 1, wherein representing the malware transactions comprises forming the clusters in a learning process that analyzes a first set of known innocent transactions and a second set of known malware transactions.

3. The method according to claim 1, wherein the distance metrics and the criterion are defined irrespective of a number of the elements in each cluster.

4. The method according to claim 1, wherein representing the malware transactions comprises forming the clusters using a first distance metric, and wherein measuring the distance metrics between the new input communication transaction and the clusters comprises using a second distance metric that is different from the first distance metric.

5. The method according to claim 1, wherein measuring the distance metrics comprises assigning each cluster a respective weight.

6. The method according to claim 5, wherein the respective weight assigned to each cluster does not depend on a number of the elements in the cluster.

7. The method according to claim 1, wherein representing the malware transactions comprises representing each cluster by a single respective representative transaction, and wherein measuring the distance metrics comprises calculating the distance metrics between representative transactions of the respective clusters and the element representing the new input communication transaction.

8. The method according to claim 7, wherein representing each cluster by the respective representative transaction comprises calculating a center of mass of the malware transactions in the cluster.

9. The method according to claim 1, wherein evaluating the criterion comprises identifying a new malware variation associated with one of the clusters.

10. The method according to claim 1, and comprising invoking responsive action upon deciding that the new input communication transaction is malicious.

11. The method according to claim 1, wherein measuring the distance metrics comprises measuring first and second different distance metrics for respective different first and second clusters.

12. The method according to claim 11, wherein measuring the different distance metrics comprises assigning to the first and second clusters respective different weights that emphasize different dimensions of the multi-dimensional space.

13. The method according to claim 1, wherein representing the malware transactions comprises receiving a definition of the clusters from an external source.

14. Apparatus, comprising:
an interface, which is configured to receive communication transactions held in a computer network; and
a hardware processor operatively coupled to the hardware interface, which is configured to hold a specification of multiple features, which are present in the communication transactions conducted between computers and which are indicative of whether the transactions are exchanged with a malicious software, to represent a plurality of malware transactions by respective elements in a multi-dimensional space, whose dimensions are spanned respectively by the features, so as to form plurality of clusters of the elements, wherein each transaction is represented by a respective tuple in the multi-dimensional space and different families of malware transactions correspond to different clusters of the plurality of clusters, and upon the at least one hardware interface receiving a new input communication transaction conducted between computers in the computer network, the at least one processor is configured to identify whether the new input communication transaction is malicious by at least:
representing the new input transaction as a new element tuple in the multi-dimensional space;
measuring respective distance metrics between the new element of the multi-dimensional space and each cluster of the plurality of clusters, and
evaluating a criterion with respect to the distance metrics, wherein evaluating the criterion with respect to the distance metrics comprises: defining a classification criterion that identifies hybrid malware comprising different code sections taken from at least two of the different malware families associated with at least two different clusters of the plurality of clusters, and applying the defined criterion to the measured respective distance metrics between the new element of the multi-dimensional space and the at least two different clusters.

15. The apparatus according to claim 14, wherein the processor is configured to form the clusters in a learning process that analyzes a first set of known innocent transactions and a second set of known malware transactions.

16. The apparatus according to claim 14, wherein the distance metrics and the criterion are defined irrespective of a number of the elements in each cluster.

17. The apparatus according to claim 14, wherein the processor is configured to represent each cluster by a single respective representative transaction, and to measure the distance metrics between representative transactions of the respective clusters and the element representing the new input communication transaction.

18. The apparatus according to claim 17, wherein the processor is configured to calculate the representative transaction as a center of mass of the malware transactions in the cluster.

19. The apparatus according to claim 14, wherein the processor is configured to identify a new malware variation associated with one of the clusters.

* * * * *